Figure 1:
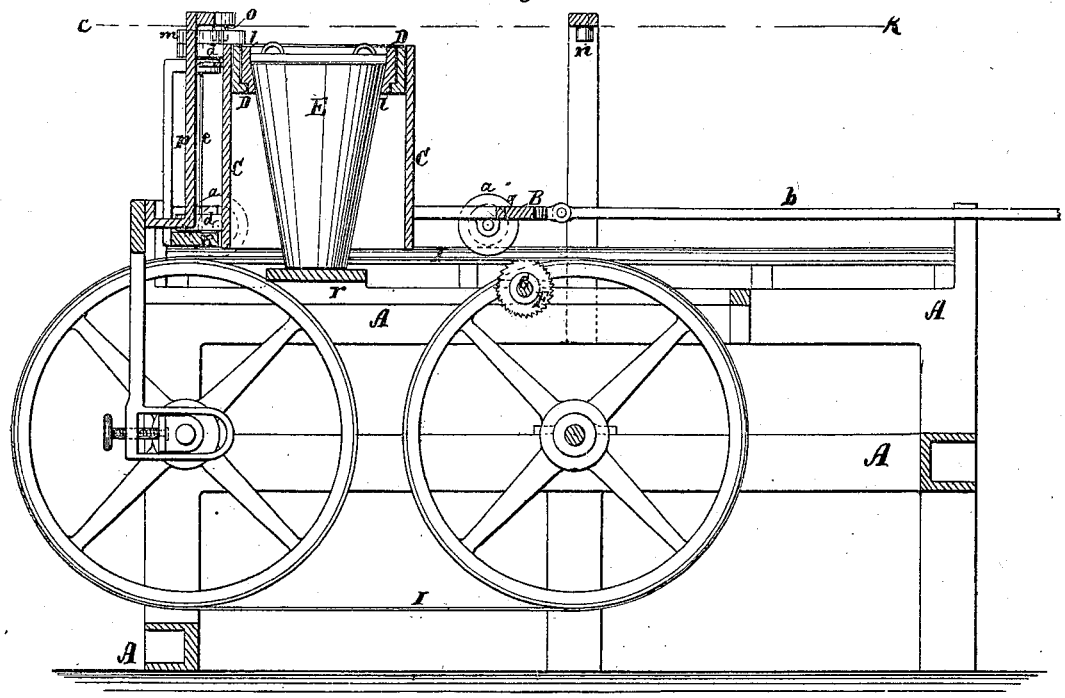

2 Sheets--Sheet 1.

P. O. BRUNJES & A. BENNECKENDORF.
Improvement in Machine for Cutting Sugar into Blocks.
No. 132,626. Patented Oct. 29, 1872.

Witnesses:
A. v. Briesen
Chas. Nida

Inventor:
Peter Otto Brunjes
Albert Benneckendorf

2 Sheets--Sheet 2.
P. O. BRUNJES & A. BENNECKENDORF.
Improvement in Machine for Cutting Sugar into Blocks.
No. 132,626. Patented Oct. 29, 1872.
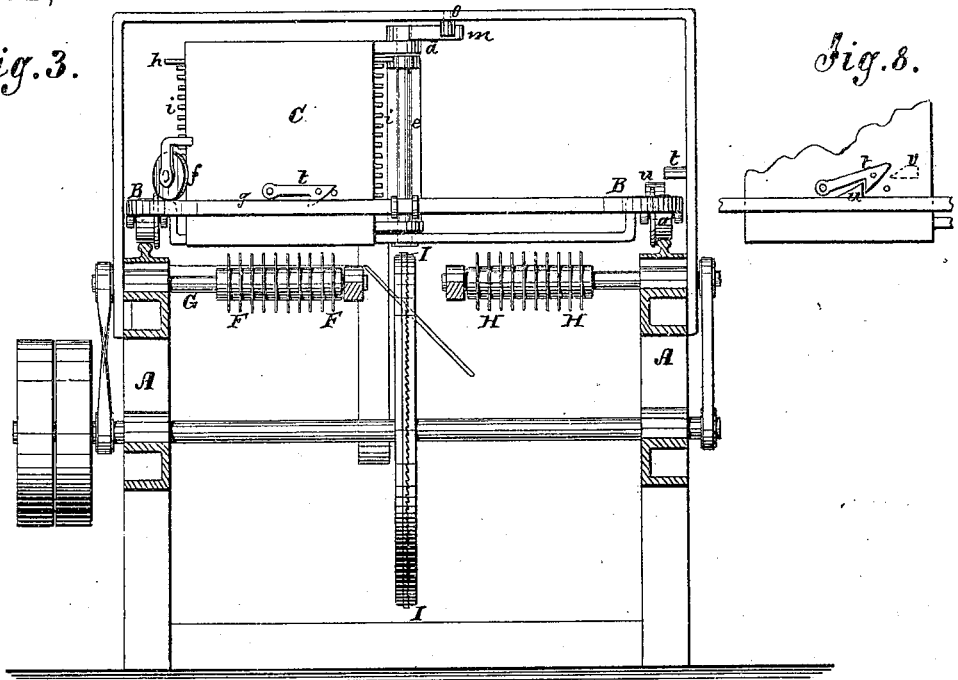
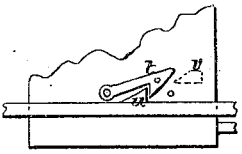
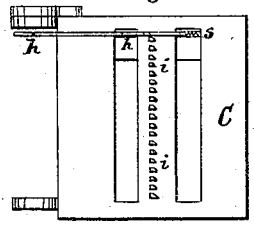
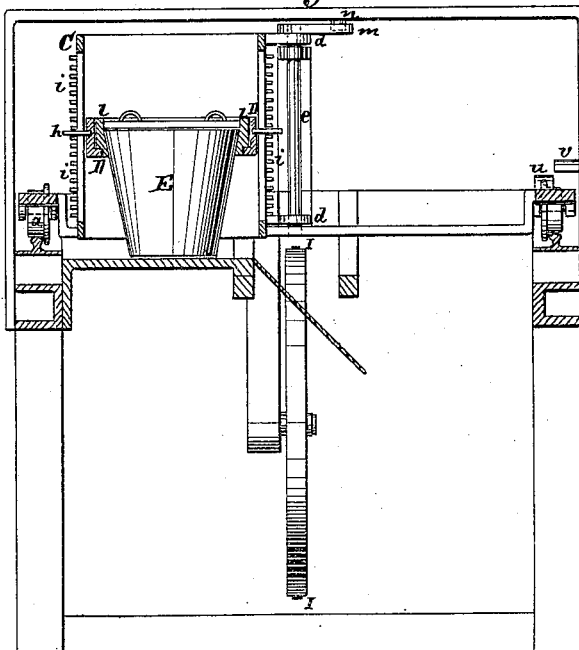
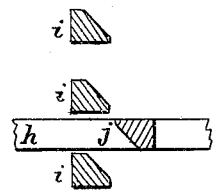
Witnesses: Inventor:

UNITED STATES PATENT OFFICE.

PETER O. BRUNJES AND ALBERT BENNECKENDORF, OF HOBOKEN, NEW JERSEY.

IMPROVEMENT IN MACHINES FOR CUTTING SUGAR INTO BLOCKS.

Specification forming part of Letters Patent No. 132,626, dated October 29, 1872.

*To all whom it may concern:*

Be it known that I, PETER OTTO BRUNJES and ALBERT BENNECKENDORF, both of the city of Hoboken, in the county of Hudson and State of New Jersey, have invented a new and Improved Machine for Cutting Sugar-Cones into Blocks, of which the following is a specification:

Our invention has for its object to devise a machine whereby sugar can be cut into blocks of suitable size and shape directly from the cone.

The sugar-cutting machines which thus far have been brought into practical use require a great power, as they all serve to cut the entire cone, at one operation, into a series of disks, which disks are then cut into bars and the bars clipped into cubic blocks. The power required for the first sawing process is therefore considerable; the expense of the process is therefore not small. The handling of the disks, moreover, is objectionable, and consumes time, while the clipping of the bars produces fractures and not clean cuts, and impairs consequently the appearance of the blocks. Another objection is also the confinement of these old machines to the production of one particular size and style of blocks, whereas it may often be desirable to make the blocks in the form of parallelopipeds having greater or less differences in the areas of their respective faces.

Our invention relates to a machine for grooving the base of the sugar-cone, in successive operations, by saws or other cutting-tools, in lines that are at suitable angles to each other and for detaching by a band-saw the blocks that are formed by every set of the aforementioned incisions or grooves from the end of the cone. By this means we are enabled to cut the blocks of suitable form from the lower face of the cone by short cuts, which require but little power and give quite even and smooth surfaces to the several blocks. By making short incisions the cutting-tools will not be strained nor clamped in the sugar, and they will not be as thick as they must be when entering deep into the cone, as hitherto; consequently there will be considerably less waste in form of sugar-dust.

We accomplish the aforementioned objects by the use of a movable receptacle, within which the sugar-cone is suspended and by and with which the lower end of the cone is fed to the several saws or cutting-tools to be grooved and then detached. After the detachment of a layer of blocks from the cone the same is fed down automatically, by means provided for that purpose, to expose another thickness to the action of the cutters, and so forth until the cone has been cut up. The receptacle supporting the sugar-cone is pivoted to a sliding frame and swung at the requisite angle to meet the several series of cutters that make the incisions in its lower end.

Figure 2:
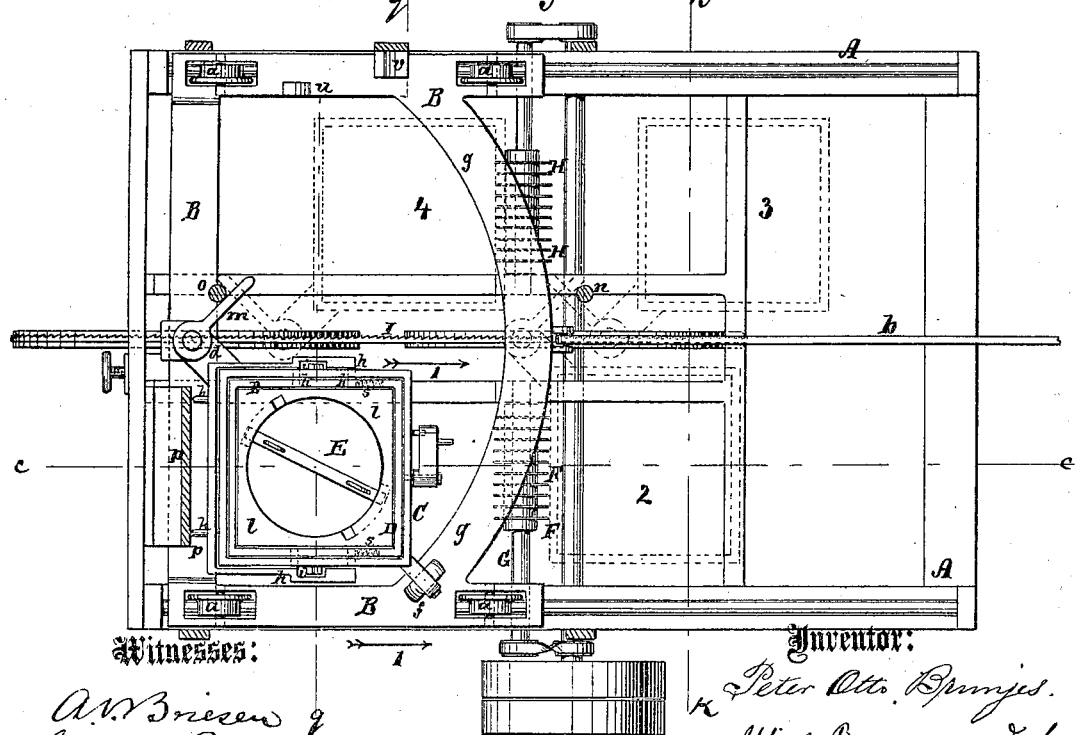

In the accompanying drawing, Figure 1 represents a vertical longitudinal section of our improved sugar-cutting machine, the line $c\,c$, Fig. 2, indicating the plane of section; Fig. 2 is a top view partly in section of the same, the line $c\,k$, Fig. 1, indicating the plane of section; Figs. 3 and 4 are vertical transverse sections of the same taken respectively on the lines $k\,k$ and $q\,q$, Fig. 2; Fig. 5 is a detail side view of the outer cone-holder; Figs. 6 and 7 are detail enlarged sectional views of the lock for holding the same elevated and for lowering it; and Fig. 8 is a detail side view of the lock for securing the vibrating cone-holder.

Similar letters of reference indicate corresponding parts.

A in the drawing represents the supporting-frame. B is a sliding frame supported thereon by rollers $a\,a$ and connected, by a rod, $b$, or otherwise, with machinery whereby it is moved back and forth on the frame A. C is a prismatic box provided at one corner with projecting ears $d\,d$, through which a vertical pin, $e$, pivoting it to the frame B, is passed. On this pin the box C can swing. At the corner which is diagonally opposite to the ears $d\,d$ the box C is supported by a wheel, $f$, on a curved track, $g$, that forms part of the frame B, so that when the box is vibrated on the pivot $e$ the supporting-wheel may travel on said track. The center of the curve $g$ is of course in the axis of the pin $e$. D is a prismatic frame fitted within the box C. This frame is connected or provided with two sliding bolts, $h\,h$, which are applied against the sides of the box C, and entering the sides of D through slots in C, shown in Figs. 4 and 5.

The two bolts are, as in Fig. 2, connected together in front of the box C. The sides of the box C have series of projecting teeth $i\ i$, between two of which each of the bolts $h$ fits in to support the frame D. That portion of each bolt $h$ which enters between two teeth $i$ is itself a tooth, $j$, as in Fig. 6. The cone of sugar E, to be cut, is by its base suspended within the frame D or in a detachable inner part, $l$, of said frame, as shown in Figs. 1 and 4. When the box C, with the lower end of the cone suspended through its open lower end is in the position shown by full lines in Fig. 2 the frame B is drawn in the direction of the arrow 1, and thereby the lower end of the cone moved over a series of rotary saws, F F, hanging on one shaft, G, in the lower part of the frame A. These saws F will cut grooves into the lower part of the cone, parallel to its direction of motion, and to a depth that is about equal to the length of blocks desired. The saws F F are properly spaced to groove the lower ends of the block at the requisite intervals. When the box C has passed over the saws F a projecting arm, $m$, on its corner, strikes a stationary pin, $n$, and the frame B, still moving in the direction of the arrow 1, such contact of $m$ with $n$ will cause the box to swing on its pivot from the dotted position marked 2 in Fig. 2 to that marked 3 in the same figure. The motion of the frame B is then reversed and the box moved over another set of circular saws, H H, which, in manner identical to that described with reference to the saws F, groove the lower end of the sugar cone; but as the cone has with the box C been swung at right angles to its former position the incisions made by the saws H will be at right angles to those made by the saws F. Thus a checker-work will be cut into the cone. If the angle of incisions of the two sets of saws is to be another than a right angle it can be easily so made by regulating the motion of the frame B. The less far it is moved after the projection $m$ and stop $n$ have touched, the more acute will be the angle, and the more obtuse the further it is moved. When the box C has passed over the saws H it arrives in the position marked 4 in dotted lines in Fig. 2. Its arm $m$ then strikes another fixed stop, $o$, and the frame B continuing its motion in direction opposite to the arrow 1, the box will by such contact be once more vibrated on its pivot and brought back to its original and normal position, which is shown by full lines in Fig. 2. While making this last vibratory movement the box C passes over a band-saw, I, hung in the lower part of the frame A, said band-saw being at such height as to detach the checkered lower part of the cone in blocks of the desired size. The lower end of the cone having been detached it is necessary to feed it down far enough to expose another thickness to the action of the saws F, H, and I, successively. This is done by the bolts, striking when the box C arrives in the normal position, a fixed stop, $p$, which moves them back and draws their teeth $j$ from between the teeth $i$. (See Fig. 7.) Thereupon the cone is free to drop, and falls till its lower end rests on a fixed platform, $r$, shown in Fig. 1. The cone in dropping draws the frame D down with it. When the cone has thus dropped, and immediately upon the frame B resuming its motion in the direction of the arrow 1, which liberates the bolt from the stop $p$, the bolts are moved back between other two teeth, $i$, to hold the frame D and cone suspended in the position last obtained. Springs $s$, bearing against the ends of the bolts, move them then back to lock into the tooth $i$. $t$ is a latch to lock the box C while moving from position 3 to 4. This latch, fully shown in Figs. 3 and 8, locks over a lug, $u$, on the frame B, and thus holds C in its proper position until it has passed over the saws H, when a fixed stop, $v$, on the frame A, raises the latch off the lug $u$ and allows the box to be swung into the normal position.

Having thus described our invention, we claim as new and desire to secure by Letters Patent—

1. The box C pivoted to a reciprocating frame, B, to conduct the sugar-cone over the series of cutters, as set forth.

2. The fixed stops $n$ and $o$ arranged on the frame A, in combination with the arm $m$ on the box C for vibrating the same, as specified.

3. The frame D fitted vertically adjustable into the reciprocating vibrating box, as set forth.

4. The bolts $h\ h$ applied to the frame D and box C for holding them together and automatically lowering the cone, as set forth.

5. The cone-supporting platform $r$ and bolt-moving stop $p$, arranged in combination with the bolts $h$ and frame D, as set forth.

6. The latch $t$ applied to the box C, substantially as and for the purpose herein shown and described.

7. The combination of the saws F and H with the box C containing the sugar-cone, to operate as set forth.

8. The band-saw I, combined with the subject-matter of the foregoing clause, substantially as herein shown and described.

9. The process herein described of cutting sugar-cones into blocks by incisions into the ends of the cone and subsequent detachment of the grooved portion, as set forth.

10. A sugar-cutting machine, arranged to hold the cone in compact form to the three several kinds of cutters, as set forth.

11. A sugar-cutting machine, arranged to feed the sugar-cone in the direction of its axis against the cutting implements, as specified.

PETER OTTO BRUNJES.
ALBERT BENNECKENDORF.

Witnesses:
  A. V. BRIESEN,
  CHAS. NIDA.